(12) United States Patent
Krishnaiyer et al.

(10) Patent No.: US 8,271,939 B1
(45) Date of Patent: Sep. 18, 2012

(54) METHODS AND SYSTEMS FOR DATA INTROSPECTION

(75) Inventors: Ramanarayanan Krishnaiyer, Bangalore (IN); Thomas Lane, San Francisco, CA (US); Sameer Bhatt, Uttar Pradesh (IN); Gaurav Priyadarshi, Jharkhand (IN); Sreenivas Ramaswarmy, Karnataka (IN); Sunil Bannur, Karnataka (IN); Mayank Kumar, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 412 days.

(21) Appl. No.: 12/271,167

(22) Filed: Nov. 14, 2008

(51) Int. Cl.
  *G06F 17/30* (2006.01)
(52) U.S. Cl. ......... 717/106; 707/795; 707/804; 717/110
(58) Field of Classification Search ....... 707/3, 802–804
  See application file for complete search history.

(56) References Cited

U.S. PATENT DOCUMENTS

| | | | |
|---|---|---|---|
| 7,480,916 B2 * | 1/2009 | Beisiegel et al. | 719/311 |
| 7,698,429 B1 * | 4/2010 | Houlding et al. | 709/226 |
| 7,711,755 B2 * | 5/2010 | Cruver | 707/803 |
| 2002/0178434 A1 * | 11/2002 | Fox et al. | 717/106 |
| 2006/0036954 A1 * | 2/2006 | Satyadas et al. | 715/742 |
| 2009/0187601 A1 * | 7/2009 | Sengupta | 707/200 |
| 2009/0204636 A1 * | 8/2009 | Li et al. | 707/103 Y |

OTHER PUBLICATIONS

Wikipedia Article, "Eclipse (software)," available at http://http//.en.wikipedia.org/wikie?Eclipse_(software), page last modified Feb. 2, 2010 (last accessed Feb. 3, 2010).

* cited by examiner

*Primary Examiner* — Robert Timblin
*Assistant Examiner* — Grace Park
(74) *Attorney, Agent, or Firm* — Kilpatrick Townsend & Stockton LLP

(57) ABSTRACT

An application development tool can support sampling of data from one or more providers of data that will be queried by the application under development at runtime. The sampling results can be used to provide hints or suggestions at development time so that a developer defining code segments that make reference to data resulting from such queries can produce code segments having the proper context to reference the data of interest. The sampling results can comprise a plurality of parameters and the application development tool can provide a user interface whereby a user can indicate custom type declarations for the returned parameters and/or identify a subset of the parameters returned by a query as being of interest. The custom type declarations and/or identified subset can be used to facilitate more meaningful hinting or suggestion by the application development tool.

24 Claims, 14 Drawing Sheets

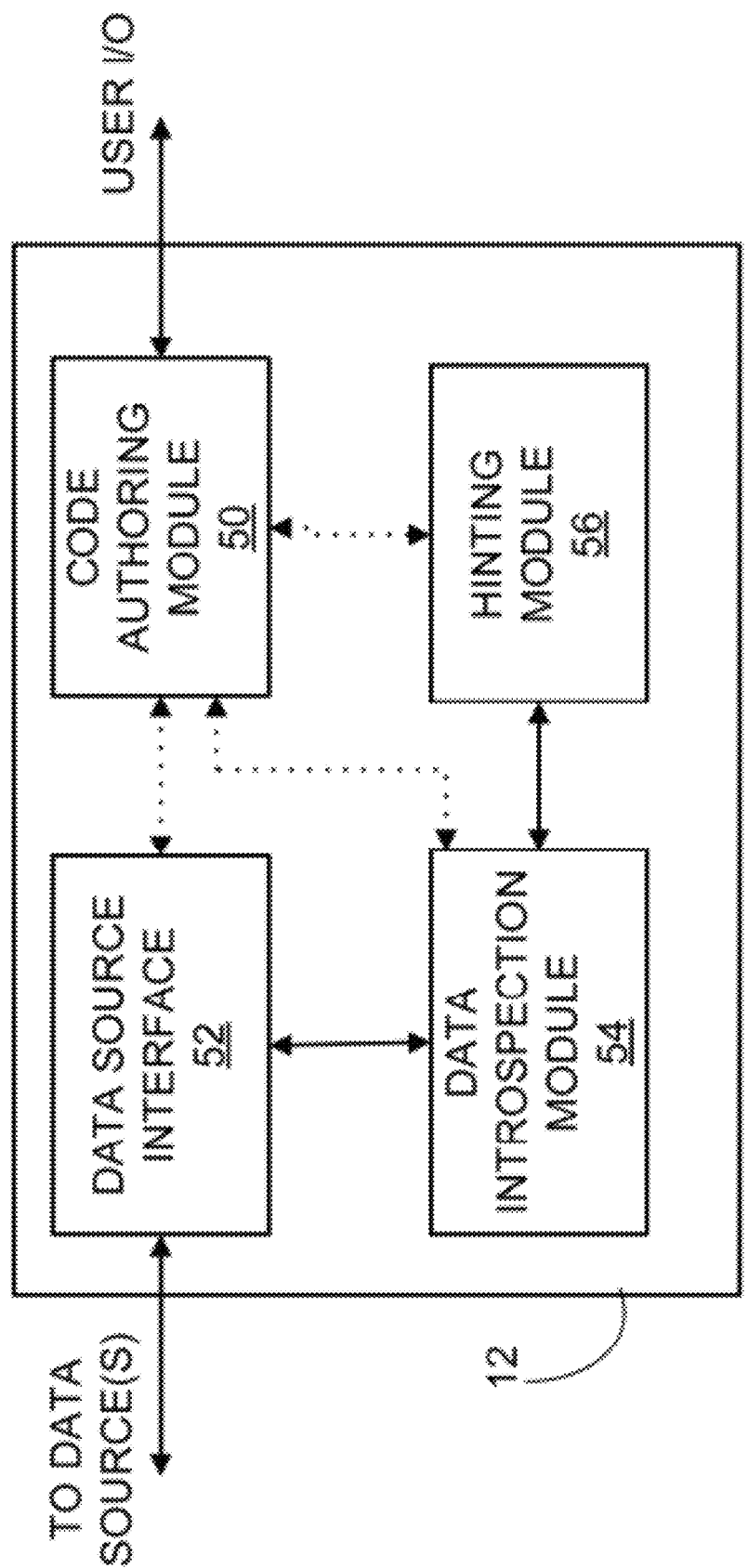

METHODS AND SYSTEMS FOR DATA INTROSPECTION

TECHNICAL FIELD

The disclosure below generally relates to application development tools.

BACKGROUND

A developer who desires to build an application generally will rely on one or more application development tools to generate source code for the application. Although source code can be entered manually in text form, much conventional application development makes use of more sophisticated authoring tools, packages or suites that, in addition to allowing text entry, provide options to aid the code authoring process.

For example, an application development tool may provide a graphical user interface whereby a developer can select common or predefined source code elements representing objects, classes, procedures, scripts, and the like or templates or frameworks for entering the same. An application development tool can support entry of source code elements drawn to specific features of a particular programming language and/or execution environment.

ADOBE® FLEX® is an increasingly popular development environment that makes use of the ACTIONSCRIPT™ programming language to define mmxl files that are complied for execution by ADOBE® FLASH® or AIR™ (all available from Adobe Systems Inc. of San Jose, Calif.).

This and other execution environments may allow for an application that handles user input and output based on a plurality of defined states while relying on data resources operating independently from the application as the ultimate source (and/or destination) of data used by the application. Use of these and other execution frameworks can present coding and other development challenges.

SUMMARY

An application development tool configured in accordance with one or more aspects of the present subject matter can aid development of applications that make reference to interaction with outside resources. For example, an application development tool may be configured for use in conjunction with an execution environment in which data parameters sent between an application and a data provider are represented as logical components, such as objects, in an application at runtime. Particularly, an application development tool can support sampling of data from one or more providers of data that will be queried by or otherwise interacted with by the application under development at runtime. The sampling results can be used to provide hints or suggestions during development so that a developer defining code segments that make reference to data resulting from such queries at runtime can produce code having the proper context or properties.

In some embodiments, the sampling results comprise one or more data parameters, and the application development tool provides a user interface whereby a user can indicate custom type declarations for the returned parameters and/or identify a subset of the parameters returned by a query as being of interest. The custom type declarations can be used to facilitate more meaningful hinting or suggestion by the application development tool. The identified subset of parameters can be used to avoid an excessive number of undesired options for referencing parameters returned by the query.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures, in which use of like reference numerals in different features is intended to illustrate like or analogous components:

FIG. 3 is a block diagram illustrating components of an exemplary application development tool.

DETAILED DESCRIPTION

Figure 1:
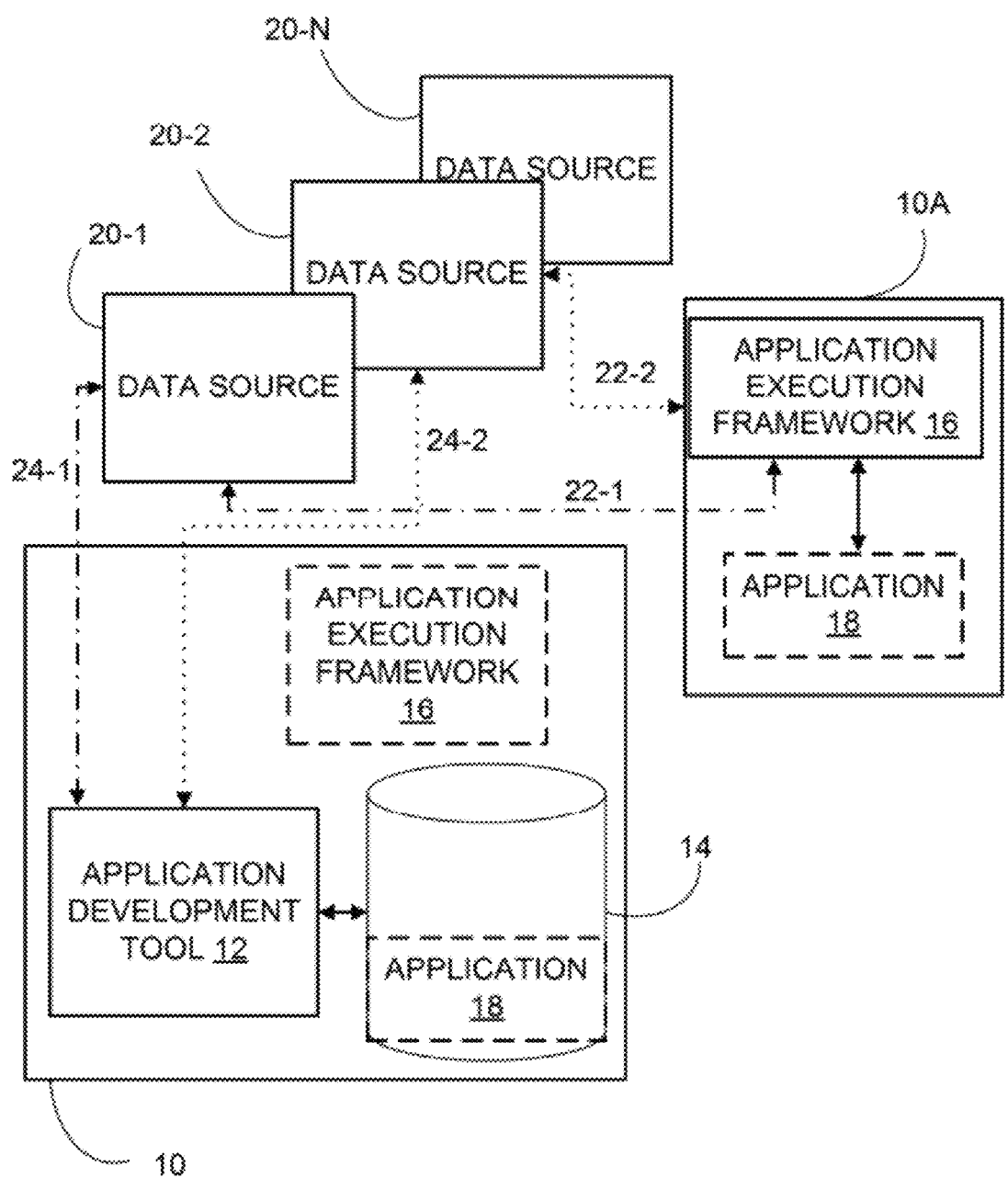
FIG. 1 is a block diagram illustrating an exemplary application development and execution environment.

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

Several examples below refer to an application development tool, source code, an application under development, runtime, and development time. Generally speaking, these terms are used in explaining how behavior of an application when executed is determined based on code components edited when the application is developed. "Source code" refers to code which, when executed, results in an "application." Depending on the particular execution environment, the source code may be compiled and then executed.

An "application under development" is meant to refer to an application when its source code is being directly or indirectly edited or inspected using an application development tool. This is also expressed by way of the terms "development time," which refers to the time during which the application's source code is being edited or inspected, and "runtime," which refers to the time during which the application is executed. "Development time" and "runtime" could overlap; for example, an application could be executed while it is being developed (e.g., debugging).

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

A computer-implemented method can comprise accessing data that refers to a source code element in source code for an application under development, the source code element referencing an interaction by the application at runtime with a data source. The interaction may comprise a query to the source, for example.

For example, the accessed data referring to the source code element can correspond to user input to an application development tool, such as textual input or interface gestures (e.g., mouse clicks, code element selections) indicating that a developer wishes to add a query or other interaction with a data source (such as a web service) by the application under development at runtime. As another example, the accessed data referring to the source code element can correspond to previously-written code for an application under development that already includes code referencing a query. For instance, accessing data can comprise opening a file with the application development tool, with the opened file comprising code that includes one or more source code elements that reference the query or other interaction with the data source.

The method can comprise querying the data source based on the accessed data. In some embodiments, if a query will be provided by the application under development at runtime, the same query is provided by the application development tool at development time. The method can comprise receiving a data sample returned by the data source in response to the query, characterizing the returned data, and storing one or more characterizations of the data in a computer-readable medium.

"Characterizing" the data can comprise finding the underlying data type and/or structure directly from the protocol or through the sample data. For instance, the data may be "strongly typed" when it is returned, such as if the AMF (Action Message Format) protocol is used and strong types are discernable. However, the data may be "weakly typed," (such as some XML or JSON data) but configured to be "strongly typed" via the tool. The tool can support characterizing data without the use of strong types, however, independent of whether the data is strongly typed at the source.

A characterization may relate to how the data returned by the query will be represented in the application at runtime. For instance, the application at runtime may treat data returned by the query as one or more objects or other logical units. Characterizations of the data parameter(s) can include data defining the object(s) or properties thereof that correspond to data parameters returned by the query. For example, one or more parameters returned by the query can be correlated to data types used by components of the application under development when referring to those parameters at runtime.

In some embodiments characterizing the returned data is based on user input comprising customized type information. The customized type information can comprise names or other references to the objects provided by a developer via a suitable interface generated by the application development tool. This can, in some implementations, allow a developer to easily write code having definitions with meaningful parameter names. Additionally, the developer may provide names for bundles of parameters (e.g., classes, objects, or other language-level description) for referring to the parameters in the code to thereby use "Strongly Typed" code.

In some embodiments, characterizing the returned data comprises inferring a data structure definition for the returned data. For example, the data returned by the query may have some sort of underlying structure such as a tree or other logical organization of the parameters. A data structure definition for the returned data can be inferred in some embodiments by using heuristics based on the format of the returned data. Thus, characterizing returned data can include determining a data parameter's relative location in a data structure. As an example, nested objects may be recognized through analyzing the structure of a returned xml document.

In some embodiments, characterizing the returned data comprises identifying a subset of the returned data structure as being of interest based on user input. Continuing with the example of data parameters organized into a tree, a developer may indicate that only a certain subset (or subsets) of the tree is of interest. This indication can be stored by the application development tool and can be used to provide hints to the developer. As another example, the indicated subsets can be used to determine the structure, selection, and/or organization of objects or other logical units included in the source code used by the application at runtime to refer to the parameter(s). For example, based on the inferred structure and user-indicated subset, code referring to objects for only portions of the returned data may be generated instead of objects for all portions of the returned data.

In some embodiments, storing a characterization of the returned data comprises adding a source code segment to the source code for the application under development that references the query to the data source. For example, if a developer indicates that a new query is to be added, source code corresponding to the new query can be generated based on developer input provided through a suitable interface.

In some embodiments, storing a characterization of the returned data comprises adding a source code element to the source code for the application under development, with the source code element referencing data returned to the application at runtime. For example, the developer may desire for one or more user interface components of the application under development to make reference to parameters returned to the application at runtime. The method can comprise automatically generating and adding appropriate source code for those user interface components, such as providing the proper reference to the object(s) or other logical units representing the parameters.

In some embodiments, a characterization of the data comprises creating a data type within the application under development that corresponds to data returned from the query at runtime. As mentioned above, an application may make reference to data returned by a query at runtime by way of one or more objects or other logical units. Storing data based on a characterization can comprise automatically generating suitable code to generate a data type for those objects that correspond to data from the query. If a user has provided custom type characterizations, then the customized types can be used in generating code for the created data type(s). For example, the customized type information may refer to "strong type" information that refers to a subset of data returned from the query as a particular class or other logical unit.

In some embodiments, the method comprises outputting a hint at development time based on the characterization of the returned data. For example, outputting a hint can comprise suggesting a source code segment for referencing data returned by a query made at runtime. The hint may provide a developer with information about the proper syntax for referencing the correct object or other logical unit in the code that corresponds to the data of interest. If the developer has provided custom type information, the custom type information can be used in the hint. As another example, outputting a hint can comprise evaluating at least one source code segment referencing data returned by the query and suggesting a change to the syntax of the segment.

In some embodiments, a computer system can comprise a plurality of hardware or software modules that provide functionality for an application development tool. For example, the system can comprise a code authoring module configured to (i) receive input specifying elements for an application under development and (ii) store corresponding source code in a computer-readable medium so that, when the source code is executed, the application includes the specified elements.

The system can further comprise a data source sampling module configured to (i) recognize a source code element representing an interaction between the application and a data source at runtime, (ii) query the data source, and (iii) receive a data sample in response to the query, the data sample comprising one or more data parameters or values. The system may also comprise a data introspection module configured to characterize the returned data of the data sample.

As mentioned above, characterizing data returned from the data source can comprise inferring a data structure for data returned in response to the query and a data parameter's relative location in the data structure. In some embodiments, the data introspection module is configured to characterize a data parameter returned from the data source based on user input specifying a custom type characterization for at least one item of the data.

The computer system can comprise a hinting module configured to (i) recognize user input specifying a source code element at least partially referencing a query or data returned by a query to the data source and (ii) provide output comprising a suggested type characterization for use as part of the source code element. For example, if the user has specified a subset of a plurality of data parameters in the data structure as being of interest, the hinting module output can comprise a plurality of data parameters of the subset. As another example, the hinting module can provide options for completing incomplete references in the source code to data returned by the query, such as suggesting proper syntax for referring to one or more objects.

Certain embodiments of the present subject matter include a computer-readable medium or media embodying program instructions. The instructions, when executed by a computer system comprising one or more computing devices, can execute one or more methods, processes, or sequences in accordance with aspects of the present subject matter and/or configure the computer system to comprise a plurality of software modules that provide functionality in accordance with aspects of the present subject matter.

FIG. 1 is a block diagram showing an example of one operating environment including software configured in accordance with aspects of the present subject matter. In this particular example, two computing devices 10 and 10A are shown. Computing device 10 includes an application development tool 12 configured in accordance with the present subject matter. For example, application development tool 12 may be used to develop application 18, shown as stored in local data store 14 of computing device 10. Computing device 10 may also include application execution framework 16 for testing purposes. Depending on the particular implementation, application development tool 12 could itself be executed via execution framework 16.

For example, application execution framework 16 may comprise a player that can support SWF files such as ADOBE® FLASH® player. As another example, application execution framework may comprise ADOBE® AIR™ environment. Application 18 may be maintained in any suitable form or forms. For example, for development purposes, application 18 may be maintained as one or more source code files. The end user may have access only to application 18 in the form of executable code. However, in some embodiments, application 18 could be executed directly from the source code.

Computing device 10 may represent a developer computing system, while computing device 10A represents an end-user system. Computing device 10A uses application execution framework 16 and has access to application 18. For example, computing device 10A may have access to a local copy of application 18 and/or may access application 18 from a network resource such as a server. Computing devices 10 and 10A may be linked to one another and/or one or more of data sources 20 via one or more networks.

Regardless of the particular execution framework, application 18 may be intended for use alongside one or more data sources 20. For example, application 18 may query data source 20-1 for one set of data, data source 20-2 for another set of data, and so forth in the course of execution. This is represented in FIG. 1 by links 22-1 (to data source 20-1) and 22-2 (to data source 20-2). It will be understood that more or fewer links may be used, and the particular number will, of course, depend on the operations intended for application 18. A data source 20 may be a remote resource accessible by way of one or more networks (e.g., the Internet). However, application 18 may provide requests and receive responses from local resources, and so data sources 20 should not be viewed as limited to resources separate from the computing device(s) executing application 18.

At runtime, application 18 may be configured to seamlessly access required data and format the data in a desired manner for one or more users. In practice, data access, formatting, and manipulation will occur by way of program elements defined by one or more programmers using an application development tool or tools 12 in designing or updating application 18.

Figure 2A:
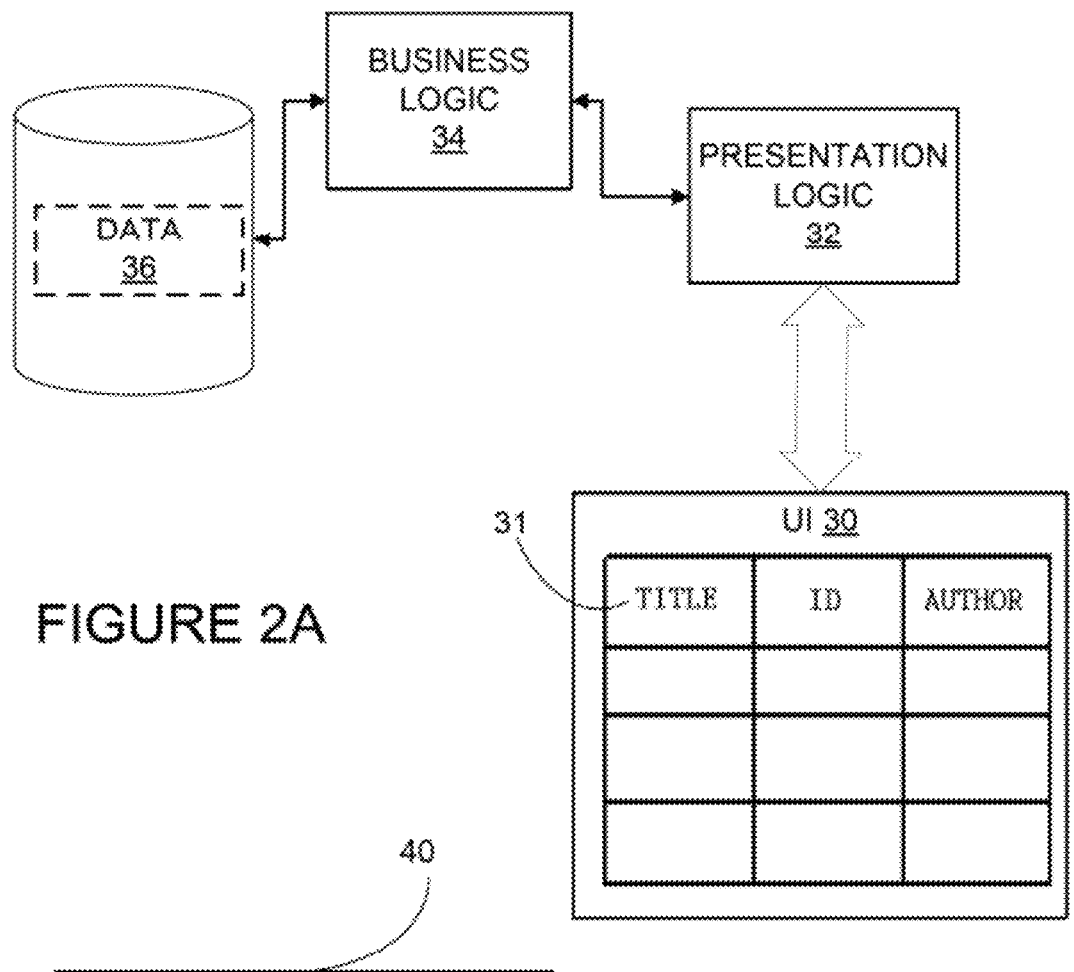
FIG. 2A is a block diagram illustrating aspects of an exemplary application execution environment in more detail.
Figure 2B:
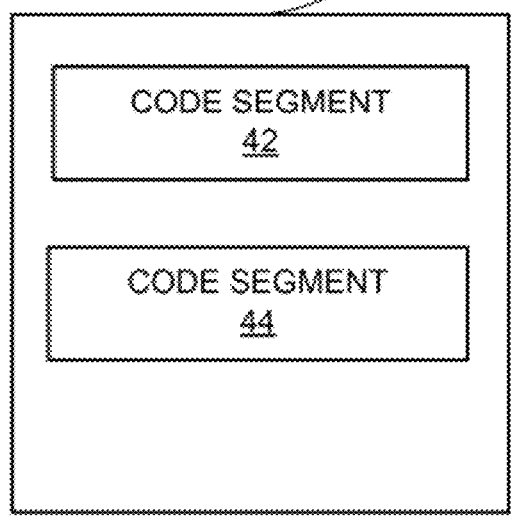
FIG. 2B is a block diagram illustrating exemplary segments comprising source code for an application.

FIGS. 2A and 2B illustrate aspects of application 18 that can be relevant to application development. FIG. 2A depicts an example of how application 18 can operate in a multi-tier environment. In this example, application 18 provides a user interface 30 that, in conjunction with presentation logic 32, comprises a "presentation layer."

For instance, application 18 may be used to browse a set 36 of data related to books. Thus, in this example, the user interface generates a table 31 including columns "Title," "ID," and "Author." The user interface is generated by presentation logic 32, which provides suitable requests for data, receives data of interest, and otherwise acts in response to user input.

In some implementations, user interface 30 and presentation logic 32 may not directly access data set 36. For example, data set 36 may be in any number of formats and/or the data provider may restrict the extent to which the data of data set 36 is available. Instead, data set 36 may be available only via a "business logic" layer represented at 34. For example, business logic layer 34 may comprise a Web Service, HTTP Url, or a remote object such as a server-based Java object that handles requests and/or events generated by application 18 and provides data and/or other responses. Examples of output provided by business logic 34 include PHP, JSON, XML, and the like.

Turning to FIG. 2B, a generalized block diagram 40 is shown to represent source code for application 18. For instance, if application 18 represents a SWF file executable in the ADOBE® FLASH® or AIR™ environment, source code 40 for application 18 may be written in mxml and the ACTIONSCRIPT™ languages and compiled into a SWF file for distribution and execution. However, the teachings of the present subject matter are independent of the exemplary programming language and execution environments discussed herein.

Source code 40 in this example comprises code segment 42 and code segment 44. In the book example above, the data displayed in table 31 is obtained from data set 36. Thus, in this example, source code segment 42 represents a suitable call to business logic 34 to be made by the application at runtime. Code segment 44 may be used to define a table element comprising a plurality of columns, with the table contents indicated by reference to the results from the call to business logic 34 as represented in code segment 42. When compiled and executed, code segments 42 and 44 (along with the remainder of source code 40) can result in a rendering of table 31 depicting data 36 as part of the user interface 30.

As another example, consider a call to a service that provides the temperature at a particular location from a weather service. A code segment 42 can comprise a declaration of a web service that includes a URL or other identifier of the service and a query (along with any required parameters for the query). Code segment 44 can specify a text box with a data binding (indicated by curly brackets) to a particular data item from the query as shown in the table below:

| Reference (42) to data source | Reference (44) to UI or other application element |
|---|---|
| <mx:WebService id="weatherService" | <mx:TextArea id="temp" text="The current temperature is |
| wsdl="http://weatherservice.example?temperature"> <mx:operation name="GetWeather"> | {WeatherService.GetWeather.result.CurrentTemp}."height="30" width="200"/> |

As part of the development process, a developer of application 18 can include code that ties the data returned by a call to a data provider at runtime to one or more particular user interface or other elements of the source code. For example, the application may treat returned data parameters as objects or other suitable logical units. In order for another element to reference the data at runtime, code for the element must correctly reference the object(s) corresponding to the data of interest. In the example above, the user interface element "TextArea" was tied to the call "GetWeather" from data source "weatherService" by the code segment WeatherService.GetWeather.result.CurrentTemp.

Although the developer could manually write the code, this process may be tedious or time consuming. Particularly, in order to properly use data returned by the call to the data provider, the developer will need to know that the data of interest (temperature in the example above) is referred to as "CurrentTemp." Although this is clear in the hypothetical example above, it may not always be as clear in practice.

For example, in the FLEX® architecture, after a service operation executes, the data that the service returns is placed in a result object. By default, the data returned is represented as a simple tree of ActionScript objects. For example, some implementations of FLEX interpret the XML data that a web service or HTTP service returns to appropriately represent base types, such as String, Number, Boolean, and Date. For example, a query to "weatherService" may simply return a set of structured or unstructured data that appears as different "objects" or numbers. In reality, these parameters could correspond to temperature, humidity, air pressure, wind speed, etc., with no explicit definition or indicator thereof in the returned data.

An application development tool 12 configured in accordance with the present subject matter can provide assistance to a developer configuring code that uses data obtained by way of accessing one or more data providers. FIG. 3 is a block diagram illustrating aspects of an embodiment of the present application development tool 12 in closer detail. For ease of explanation, not all possible components of application development tool 12 are illustrated—for instance, common elements of an application development tool such as a text editing engine, library management functions, compilers, debuggers, and the like are not shown but may be included.

Application development tool 12 includes a data source interface module 52 which can be used to provide calls to one or more data sources 20. As shown by the dot-dashed line 24-1 and the dotted line 24-2 of FIG. 1, these calls can use the same protocol and context during development time as will be used by the application under development at runtime. Thus, data source interface module 52 can be used to obtain a sample or test operation in order to determine the content and structure of data that can be returned from a data source 20 when the application under development requests the data.

This information can be used by data introspection module 54 to maintain information about how data returned from one or more data sources is related to particular elements of the application under development. This is generally referred to as "characterizing" the returned data herein.

For example, an object (or other logical unit) corresponding to data returned by a particular data source 20 may have a specific reference in the source code for the application under development. In some embodiments, data introspection module 54 can facilitate defining "strongly typed" objects or other components as part of the development process whereby a returned group of parameters is given custom declarations in the code that meaningfully describe their inclusion in an object or other logical unit in the context of the application. However, embodiments of the present subject matter can use characterizations of the data to provide assistance to developers even if "strong types" are not used.

The application development tool can include a code authoring module 50 configured to recognize user input specifying desired source code elements for an application under development and store corresponding source code in a computer-readable medium. For example, code authoring module 50 may be able to recognize input gestures such as hovers, left, and right clicks provided via a mouse or other pointing device and provide menus or other input selection interfaces. As another example, code authoring module 50 can receive text typed or otherwise input by a developer. Code authoring module 50 can output the source code of the application under development as text or in any other suitable manner. Code authoring module 50 is connected to other components of the application development tool to handle the details of user interaction between those components and the user of the application development tool.

During the course of development, a user may provide input specifying a source code element that represents a query to a data source by the application under development. A data source interface module 52 can be configured to recognize this input and query the data source. In response, the data source can return a data sample that is received by the data source interface module 52.

Data introspection module 54 can obtain the data sample and characterize the data. For example, data introspection module 54 can associate one or more data parameters returned by the data source to a respective type characteristic for use as part of a source code element of the application under development. As was noted above, the application under development can include user interface elements that are populated with or responsive to data obtained by calls to one or more outside resources. For example, a table may include columns with data in the columns comprising data returned from a remote source. This relationship will be represented in the source code by reference to an object or other logical unit representing data returned by the query.

For example, returning to the "WeatherService" example above, assume that the query of interest returns an object comprising four numbers: the current wind speed, the relative humidity, the temperature, and the current barometric pressure. As returned, the four numbers may be represented as "int1," "int2," "int3," and "int4" objects. In some embodiments, data introspection module 54 can be used (along with code authoring module 50) to provide an interface whereby a user can define custom parameter names for use in programming. For example, the user may be able to define "int3" as "CurrentTemp" for use in later code entry or generation.

Another example of characterizing data can include inferring a data structure for the data returned in response to the query. For example, a data source may provide data in an AMF, XML, JSON, or other format. Formats such as AMF are back-end language independent, and so can be used with back ends including PHP, CF (ColdFusion), and .NET. The data can be structured—for example, certain parameters may be grouped together and/or nested.

If the service defines strong types, those types can be used for data characterization in the development application. The type information may be returned along with the sample data. In some embodiments, the service may provide a description of its data types. In such cases, the development application can be configured to characterize the data from the service without the need to sample data from the service. As an example of obtaining type information from a server description, a PHP server can be configured to include a mechanism for describing its services (PHP classes) and then consulted for information by a development application during data introspection.

Regardless of how data type information is determined, it should be understood that typing for purposes of the development application can be independent of the typing for the service. For example, "strong" types from the service may be used to define "strong" types in the characterization data. However, strongly-typed data from a service may be characterized without strong types in a development application. Conversely, a service may provide non-strong-typed data that is treated in the development application as strongly-typed via characterization of the data, or no strong typing may be added in the characterization process Another example of identifying a service's data typing is analyzing server service code to, in effect, "understand" the service. For example, parameters and commands provided to the service can be analyzed alongside responses received in order to discern how data types are used by the service.

The data introspection module can apply heuristics to identify a data structure in the absence of or in addition to using type information from a data service. For example, a certain heuristic may be defined for each particular data type so that data parameters can be mapped into a tree or other structure. For instance, the first n rows of data can be examined for patterns. Some protocols, such as AMF, may include a data structure as part of the protocol, and so the data structure returned by the protocol can be examined as noted above. For other formats, such as XML or JSON, the data can be examined to find arrays and complex types can be marked as objects. The user may be provided an opportunity to override the object types with strong typing as mentioned above.

As another example, in some embodiments, a user may be able to specify only a subset of returned data as being of interest. Returning again to the "WeatherService" example, the query may return the object comprising the four numbers noted above as part of a large collection of data. For example, the service may return a set comprising an object for each of several different locations with the four "int" objects nested inside. Data introspection module 54 may allow a user to indicate a selection of the particular data values of interest for the application under development.

Data introspection module 54 can maintain a set of working data referencing returned parameters to object type definitions for use by the application development tool. As another example, data introspection module 54 may update the source code to include the working data, such as by adding type definitions. If a user provides custom type definitions, the objects can be defined in the code based on user input indicating the custom types.

In some embodiments, an application development tool can comprise a code hinting module 56 configured to recognize user input at least partially or potentially referencing the use of data returned by a query made by the application under development to a data source at runtime. Hinting module 56 can provide output based on the partial input and characterization(s) of the data returned by the query. For instance, a hint can suggest a type characteristic for use as part of the source code element referring to the query results, such as by offering options for completing an incomplete reference to an object or other logical unit corresponding to data returned by the query. If the user has provided custom type information for identifying the different parameters, the custom types may be used. Regardless of whether custom type information is associated with the parameters, the information obtained by the data introspection module can be used to aid a developer in writing or generating code segments.

For example, some tools can support hinting by way of popup notifications (e.g., tooltips) or auto-complete suggestions. For instance, a development tool may recognize input of "On . . . " from a user and suggest "OnClick( )", "OnMouseOver", "OnRightClick( )" or other source code segments consistent with the user's partial input.

In some implementations, information about data parameters returned by a call to a data provider can be used to generate hinting of code segments. Returning to the "WeatherService" example, a user may begin to enter a code segment referencing the query "GetWeather" by typing or inputting "WeatherService.GetWeather.result." . . . Based on this partial input, code hinting module 56 can recognize the reference to the GetWeather query and suggest one of the returned data parameters. For example, a dropdown menu or other interface may allow the user to select from one of the options below to complete the code expression:

```
.result.int1
.result.int2
.result.int3
.result.int 4
```

As another example, the user may have defined custom parameter names in conjunction with data introspection module 52. In that case, the hint options may be as follows:

```
.result.CurrentWind
.result.RelativeHumidity
.result.CurrentTemp
.result.BarometricPressure
```

As another example, consider the following pseudocode for providing a datagrid with weather results:

```
<Application onStartup="qr = q.getWeather( )"/>
  <Query id="q" service="weatherservice"/>
<QueryResult id="qr"/> <Datagrid dataprovider="{qr.result}"/>
```

In this example, the data from "weatherservice" may be characterized to recognize groupings of returned parameters. In some embodiments, the developer can be aided in configuring different columns of the datagrid (e.g., different columns for different returned parameters) based on characterization(s) of the returned data available to the development tool that specify how the data from "weatherservice" is logically arranged. Assistance can be provided by the development application recognizing that the datagrid uses data from "weatherservice" (in this example, by the binding "qr.result" which refers to the query "qr=q.getWeather( )" to "weatherservice") and consulting the corresponding data characterization(s) for data from "weatherservice" to find which parameters are returned by "weatherservice" and how those parameters are to be referred to in the code. Then, a menu or other suitable interface can be provided for a developer to select the parameter(s) of interest.

Although assistance can be provided without the use of strong types, use of strong types may be preferred by some developers in some circumstances. Consider the following pseudocode:

```
Application onStartup="qr = q.getWeather( )"/> <Query id="q"
  service="weatherservice"/>
<QueryResult id="qr"/>
<Weather id="w" source=" {qr.result}"/> (this line is new)
<Datagrid dataprovider="{w}"/> (modified)
```

In this example, the "weather" strong type is declared on the new line and the datagrid references "weather." Although this does not significantly change configuring the datagrid over the previous example (the datagrid ultimately still is populated with parameters returned by "weatherservice), it does mean that any other place "w" is referenced, the development application (and the compiler) will know its data characterization, even when the above analysis cannot deduce it. For example, if the above code is in a component used by another component, the other component might only be able to see that it has a property "w", and not analyze the code inside of it. With a strong type declaration on w, it can still see that is a piece of Weather data. The characterization of "weatherservice" could indicate, for example, that the returned parameters belong to a class "weather."

Although the examples above illustrated an application development tool by way of software modules, it will be understood that functionality can be achieved in any number of ways. For example, functions provided by different modules can be combined and/or divided amongst other modules. As another example, the application development tool may comprise a suite of tools that interoperate to achieve the desired functionality.

Figure 4:
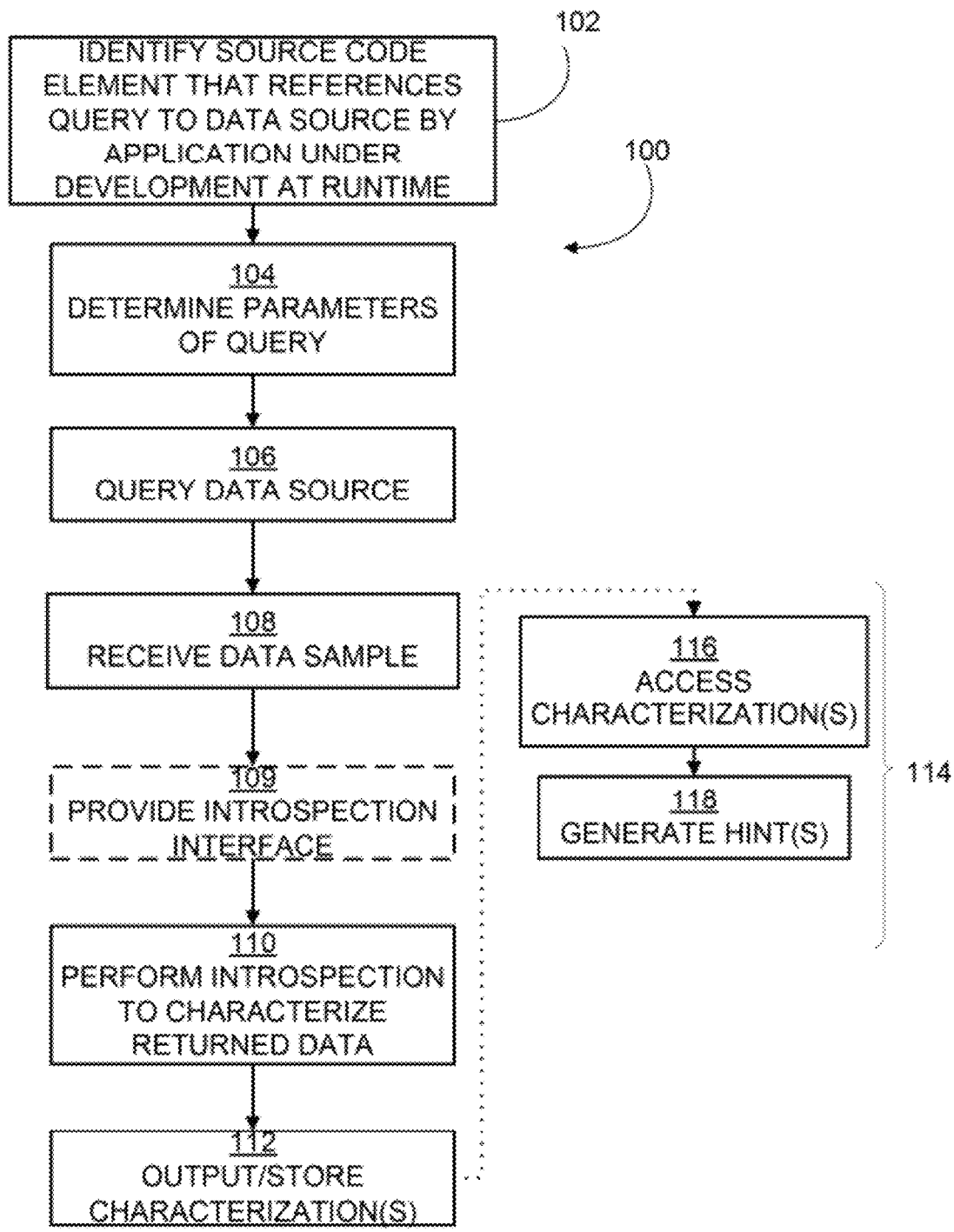
FIG. 4 is a flowchart showing an exemplary process of data introspection and hinting based on characterization of query results.

FIG. 4 is a flowchart illustrating an exemplary method 100 of data sampling and introspection. At block 102, the application development tool identifies a source code element that references an interaction by an application with a data source at runtime. In this example, the interaction is a query. However, the principles taught herein could be used to define, update, or validate code representing other interactions between an application and data source at runtime. Other interactions could include, but are not limited to, a command from the application to create a record at the data source, update a record at the data source, or delete a record at the data source (with a record referring to one or more parameters).

Since the interaction of this example is a query, at block 104, the application development tool determines parameters of the query. For example, the element may be identified by detecting user input that comprises textual entry of a definition statement for a query to a remote resource such as a web service. As another example, a user may use a mouse or other pointing device to trigger a dialog box or wizard for defining a call to a data source with corresponding text then inserted into the source code. The parameters of the query can include a URL or other address for reaching the data source, any required input parameters, and a name for referencing the query. As another example, identifying a source code element can comprise parsing existing source code to determine a reference to a query based on code syntax.

Regardless of the type of interaction at runtime, at development time the application development tool sends a query to the data source. Block 106 represents querying the data source based on the parameters specified via user input. For instance, an appropriate request with associated input parameters may be issued by the application development tool to the URL or other identifier for the data source. Block 108 represents receiving a data sample returned by the data source in response to the query.

The application development tool can be configured to generate an exception or error if the query is unsuccessful. However, assuming a successful response is received, the method moves on to block 110, which represents performing one or more introspection operations to characterize the returned data.

In some embodiments, data sampling can be combined with more complex introspection in order to further enhance the code development process, such as by associating type characterizations with the returned data. However, it is to be noted that sampling with basic introspection alone can aid in the development process in some embodiments.

For example, a "characterization" can refer to information about the basic structure of the returned data. The data structure may be known to the server or source; through introspection to characterize the data, type definitions can be defined for use in the development tool.

For instance, block 110 can represent inferring a data structure definition according to some intelligent heuristics (e.g., identifying nested statements in returned xml), with the stored characterization(s) indicating the inferred data structure. Information developed from data introspection can be used for providing information to a developer about the data, e.g., the fields within a complex data type. As another example, block 110 may represent when the development tool automatically creates data types within the application being developed that correspond to data returned from the query that explicitly describes the data structure and types In either case, the developer may be presented with information about the data and provided with options and wizards that facilitate the developer's use of data from a particular data service. This is represented as optional block 109, which represents providing an introspection interface.

As one example, the user can be given the option to provide customized type information which can then be used in characterizing the returned data. For instance, many development groups encourage the use of "strong" data typing in developing object-driven applications. As was mentioned in the examples above, data parameters returned by a query may not always fully describe the data content and may not be bundled into meaningful groups. Although a developer could simply use default characterizations (e.g. "int4" rather than explicitly referring to "barometric pressure" without a logical grouping with the other "weather" parameters), this could result in the loss of valuable code intelligence, with "code intelligence" referring to information useful to a developer in understanding how code elements are related to one another and to data sources.

Instead, the user can be presented with a dialog, wizard, or other interface depicting the structure of the returned data and providing an easy way to input more meaningful characterizations. These strong characterizations can then be used by the application development tool to generate code referencing objects that correspond to the returned data values. For example, parameters can be represented in a language-level description (e.g., a class) so that the developer can declare the type name in their code at appropriate points and then refer to the parameters within the class (or other descriptor).

As another example, the user may be presented with a dialog illustrating the inferred structure of data returned by the query and can provide feedback indicating a subset of returned data as being of interest. For example, a tree or other suitable structure can be generated and the user can mark checkboxes to indicate which elements are of interest. Based on these characterizations, the application development tool can include suitable code segments for generating objects for some, but not all, of the data returned by the query. As another example, a data binding between an object property for one element of the application and another element of the application may be suggested.

Block 112 represents outputting or storing the characterization(s) or data based on the characterization(s). For example, as was noted above, the output can include automatically generating code segments relating to data types within the application under development based on the characterizations. As another example, code defining the query can be generated if not already present in the code. Output could include altering or appending other source code elements, such as completing a source code element that references the query results by adding a reference to a particular parameter. Storing the characterizations may comprise maintaining working files so that the characterizations can be used in later sessions of the application development tool.

FIG. 4 illustrates additional blocks 116 and 118 grouped together at 114. Block 116 represents accessing one or more characterizations of data returned from a query included in the source code for an application under development. Block 118 represents generating and outputting one or more hints based on the characterizations. The hints may comprise information about, suggestions for, and/or validation of particular code segments based on the characterizations of the query and/or returned data referenced by the query. For instance, as was mentioned above, the user may input a code segment partially referencing data returned by the query, such as identifying only the base object for the query results. A hint could comprise suggesting several options for properly completing the reference such as one or more available objects that refer to particular returned parameters in the results. As another example, hinting may comprise evaluating previously-entered code to determine if proper reference has been made to data returned by the query.

Blocks 116 and 114 may follow blocks 102-112 and use one or more characterizations generated by the introspection process discussed. However, blocks 116 and 118 could be performed independently of the introspection process. For example, the code itself may be relied upon for characterizations of data returned by a query. The code can be parsed and, based on the code syntax, the proper characterizations can be returned in order to provide hints. For example, the code may already include an object corresponding to a query result and having several custom data types each corresponding to a different result parameter. If a developer indicates the addition of a code element again referencing the query result, then hints (such as suggestion of the custom data types) can be provided without the need to re-run the sampling process.

As another example, block 112 can comprise storing one more characterizations in a computer-readable medium but separately from the source code for the application under development (e.g. a metadata file). Characterizations of data returned by the query but not included in the source code in the metadata file could be relied on for hinting. For example, if a user references a query in the source code, performs introspection, and then ends the development session, in the next session, the introspection results could be relied upon by the application development tool in the next session.

In light of the foregoing, additional examples will be discussed in conjunction with an exemplary interface 200 for an application development tool shown in various states in FIGS. 5 through 13. In the following examples, interface 200 includes menu bar 202, package management area 204 (for managing different projects and project components), and code authoring area 206. Interface 200 also includes a service definition area 208 which comprises one of a plurality of selectable tabs, with the other tabbed areas corresponding to application development tool features whose details are not needed for purposes of the discussion below.

Figure 5:
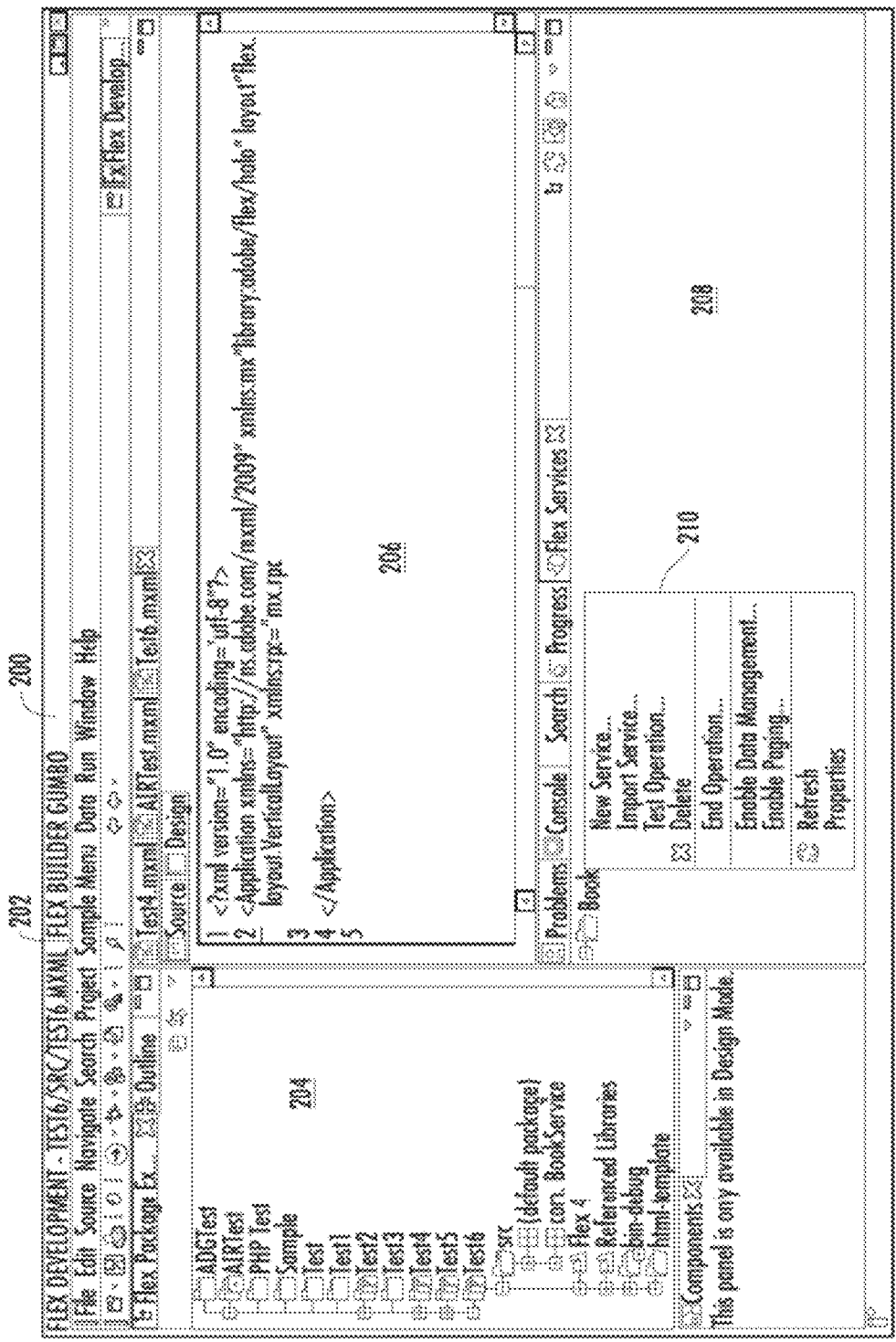
FIGS. 5, 6, 7, 8, 9, 10, 11, 12, and 13 illustrate examples of user interfaces of an application development tool that supports data introspection.

As shown in FIG. 5, the application development tool has generated a contextual menu 210 in service definition area 208. This may allow a developer to launch a dialog for defining a service and/or selecting a query supported by the service, sampling data, and providing desired characterizations of the returned data parameters for use in generating or authoring code referencing data returned by one or more queries to the service.

Figure 6:
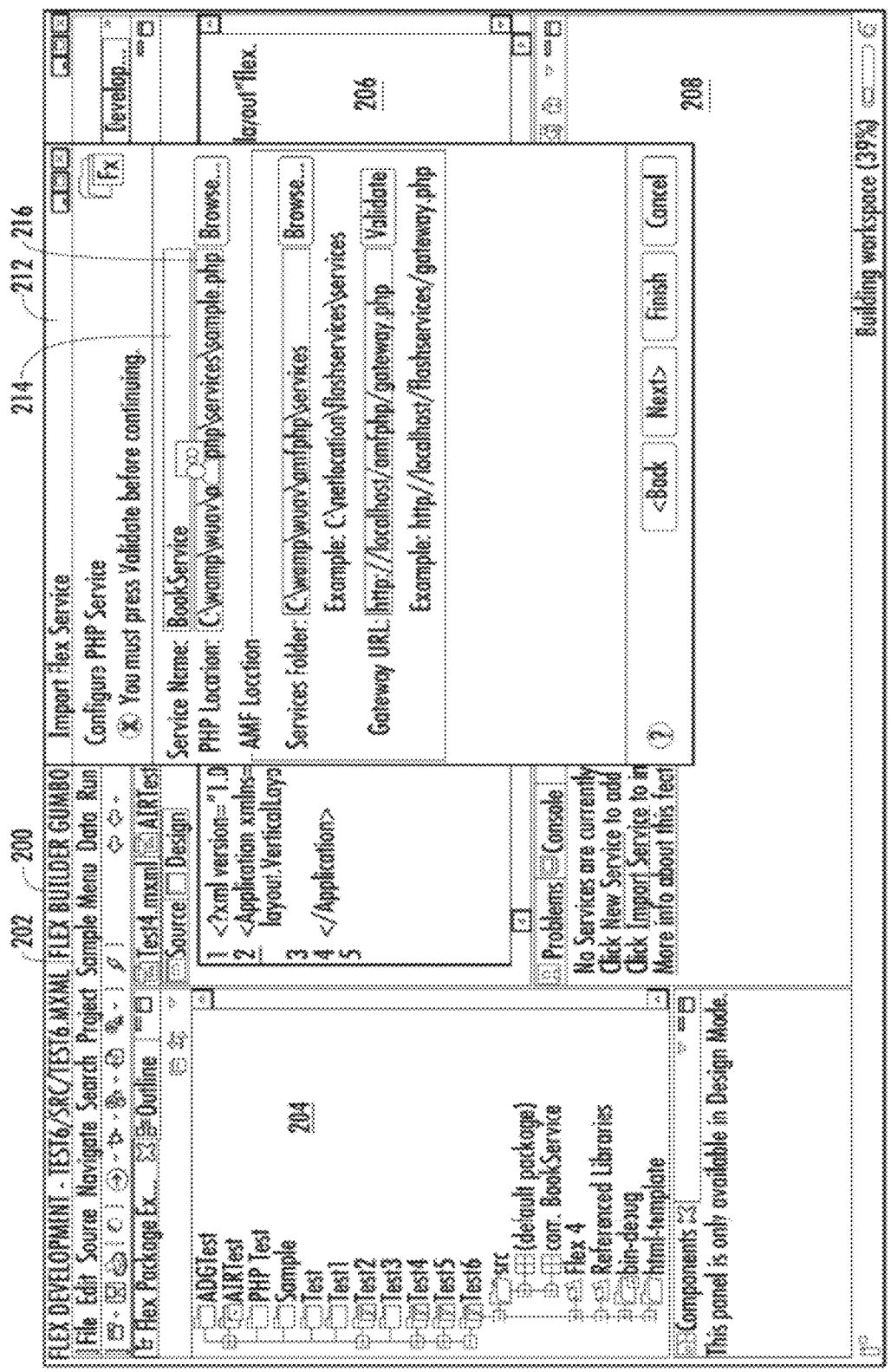

FIG. 6 depicts a dialog 212 in which the user can define a new service. In this example, the user has begun to define a reference to interaction with a PHP-based data service that returns a web page in response to a query including appropriate PHP code. Dialog 212 includes text boxes 214 and 216 where the developer can input a name for the service ("BookService" in this example) and the location for the PHP resource. The particular type of service can be selected as part of the definition process (e.g., by a selection menu prior to displaying dialog 212) or the service type may be determined automatically based on data input in dialog 212.

Figure 7:
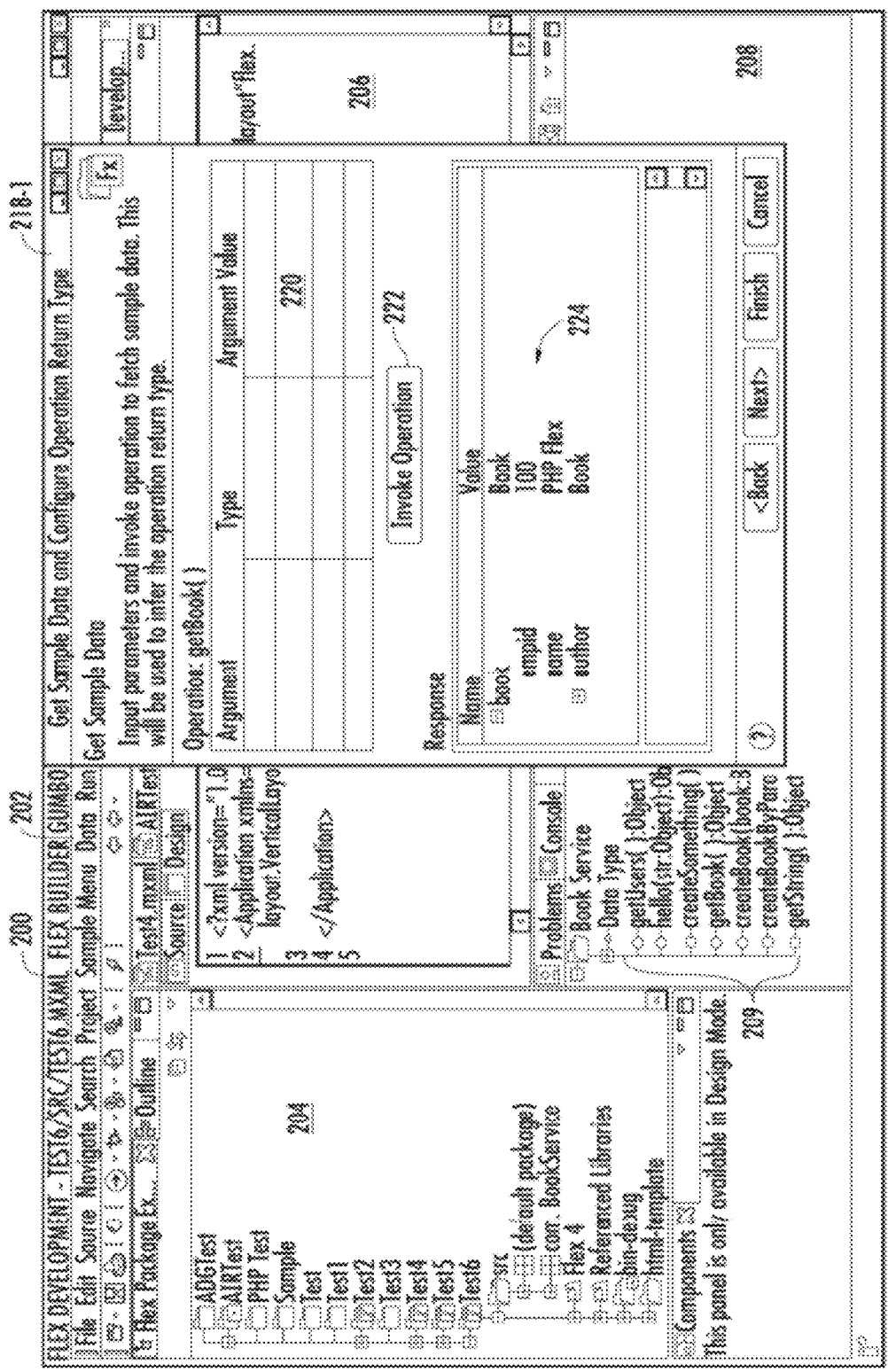

FIG. 7 shows another dialog 218-1. In this dialog, the user can provide arguments, types, and values for particular queries that may be supported by the data service. For example, as shown at 209 in service definition area 208, the service "BookService" provides a number of queries, each of which returns an "Object." The developer can select one query "getBook( )" for introspection and further characterization. The developer can provide any needed arguments in area 220 of dialog 218-1 and invoke the query via button 222. The response is indicated at 224. In this example, the query "BookQuery( )" returns a "book" object having values "empid", "name", and "author." The values of the sample data are also illustrated in dialog 218-1.

Figure 8:
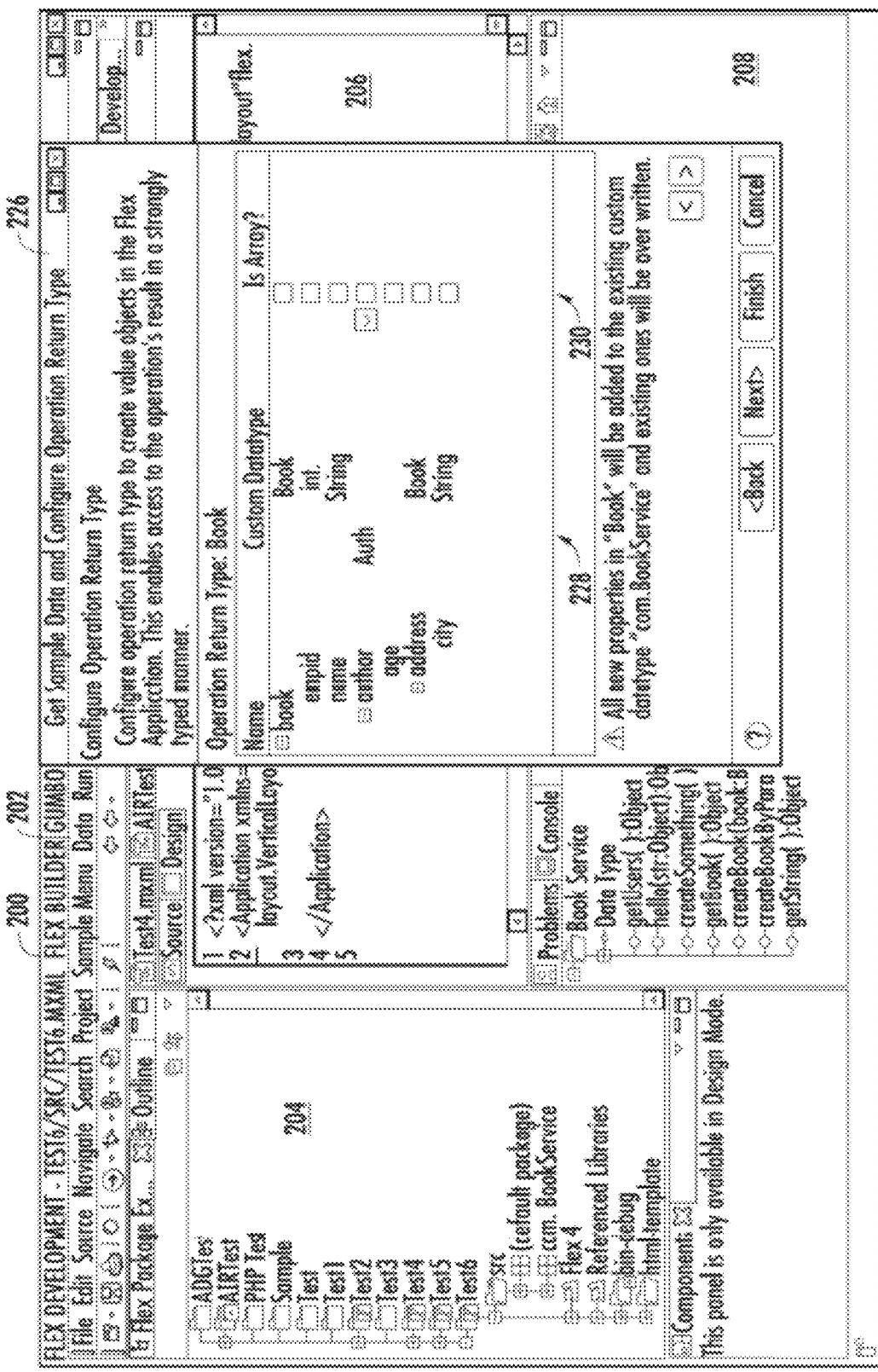

Turning to FIG. 8, the next dialog 226 illustrates how objects corresponding to data returned by the query will be characterized in the application under development. This example continues with the returned object "Book" as indicated by the text "Operation Return Type: Book." The particular parameters returned by the query are listed on the left at 228, while the logical units corresponding to the returned parameters are shown to the right at 230. In this example, the user is given the option to provide custom data types for each object. Further, in this example, the application development tool has provided default characterizations partially indicated in the table below:

| Name | Custom Data Type |
|------|------------------|
| Book | Book |
| Empid | Int |
| Name | String |
| Author | string |

As shown in FIG. 8, based on the sample data, the application development tool has also inferred the data structure. In this example, the object "book" contains an object "author" which contains the parameter "age" and another object, "address." Dialog 226 may be used by the developer to provide more meaningful characterizations of the returned parameters. For example, rather than using "Name" or "String" to refer to the data returned as parameter "Name," the developer may specify "BookTitle" for easy reference later in the code.

After the developer has provided custom data types or other characterization data, the developer can click the "finish" button and the characterizations can be stored in a computer-readable medium. For example, the characterizations (whether inferred by the application development tool, determined from user input, or both) can be used to generate code for use by the application under development in referring to data returned by the query at runtime.

Figure 9:
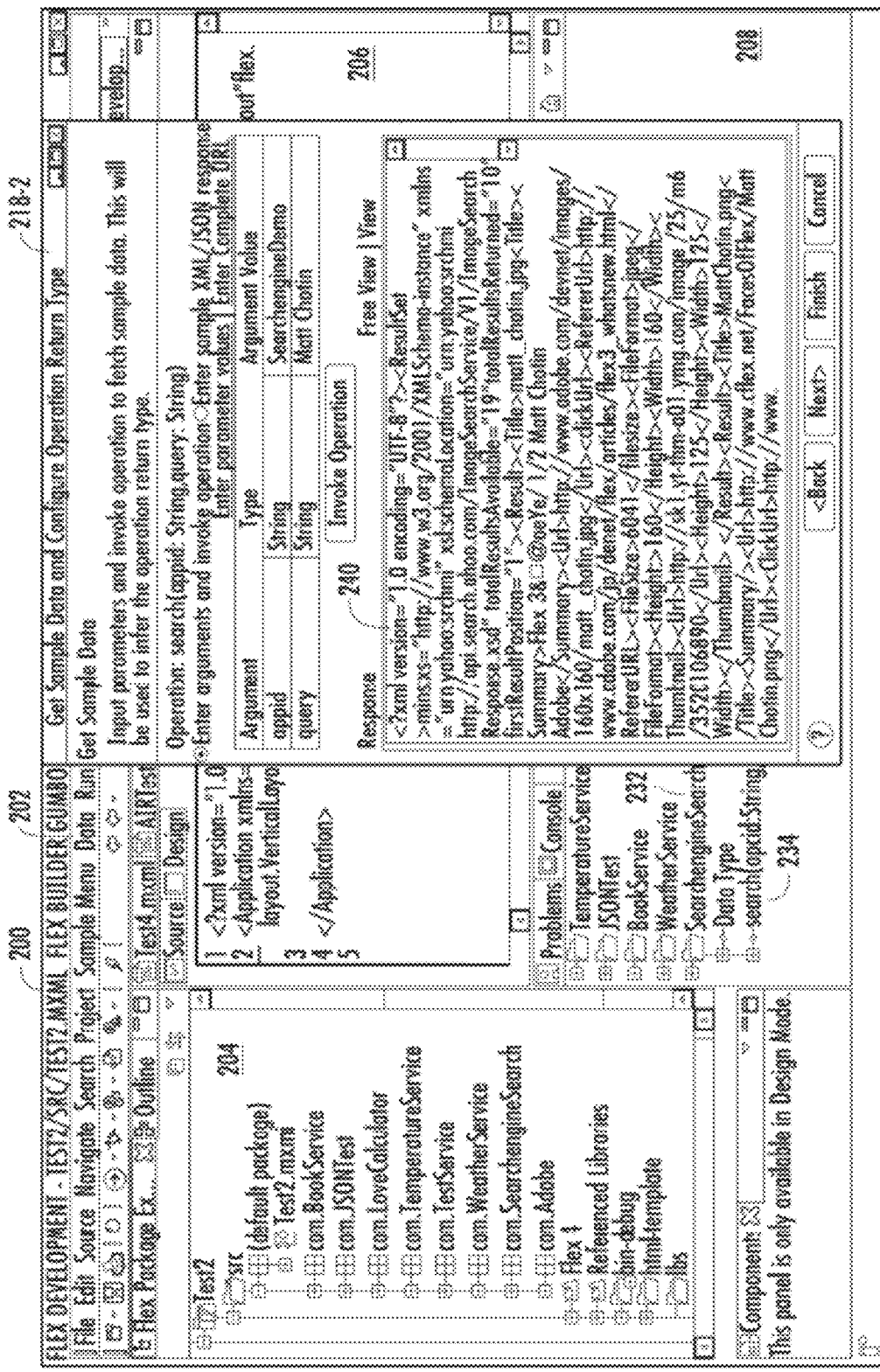

FIG. 9 shows another example of data introspection by way of interface 200. In this example, as shown at 232 in data service definition area 208, a query is made to "SearchEngineSearch," which may correspond to data made available by a search engine. Particularly, a reference to search query 234 is being defined for the application under development. In this example, as shown in dialog 218-2 at 238, query is one of two arguments submitted to the service. In this example, a "raw" view of the returned data is shown at 240. In this particular example, the query has returned xml data.

Figure 10:
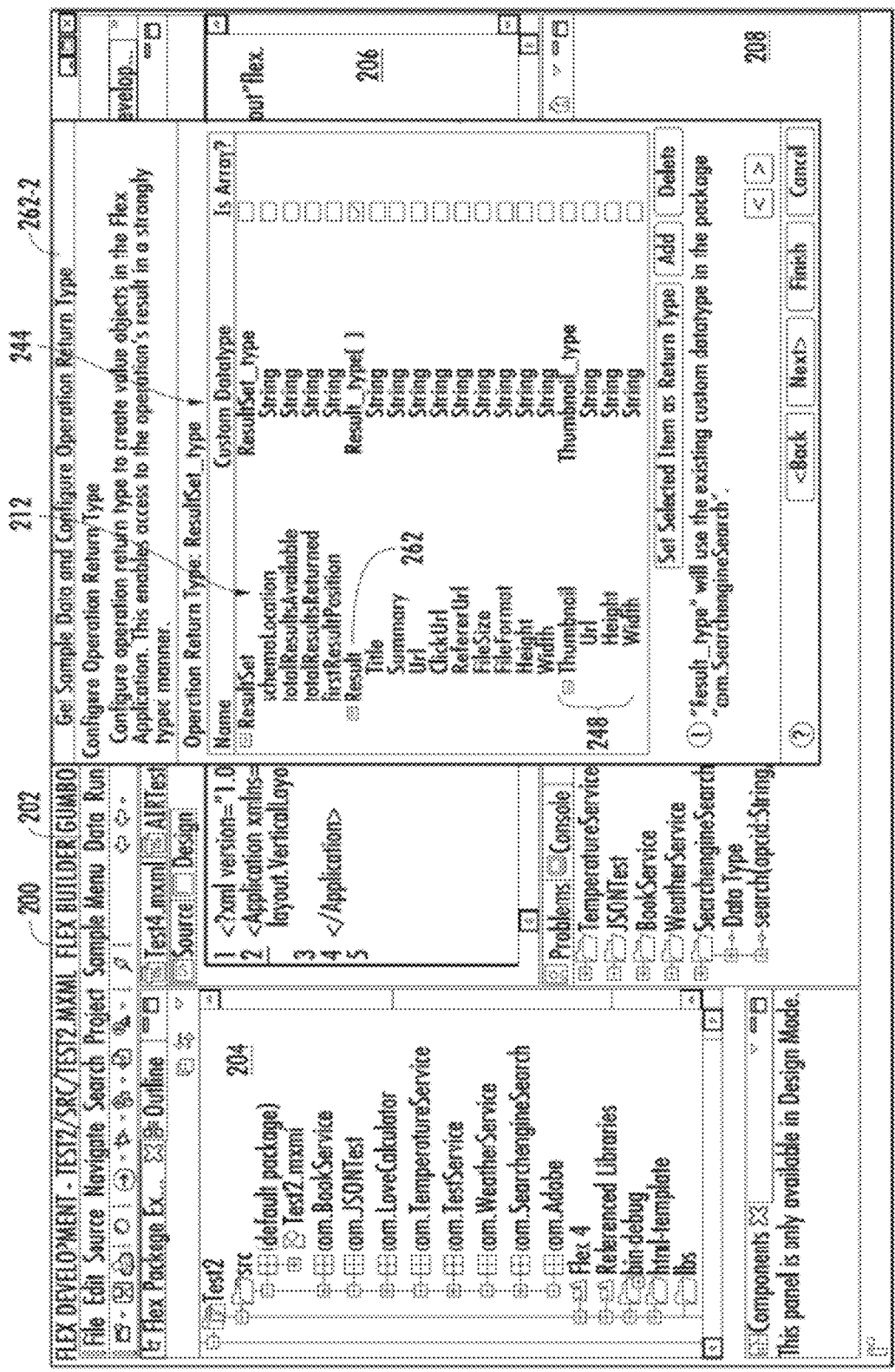

FIG. 10 shows the next dialog screen 226-2 and, as indicated at 242 the data has been characterized by inferring a tree structure for the underlying xml data. In this example, the data will be further characterized by user input. This example shows an example of selecting a subset of the data as shown at 246. Additionally, the developer has the option at 244 of defining custom data type characterizations. In the next example, use of parameters returned as part of a further subset 248 will be illustrated.

Figure 11:
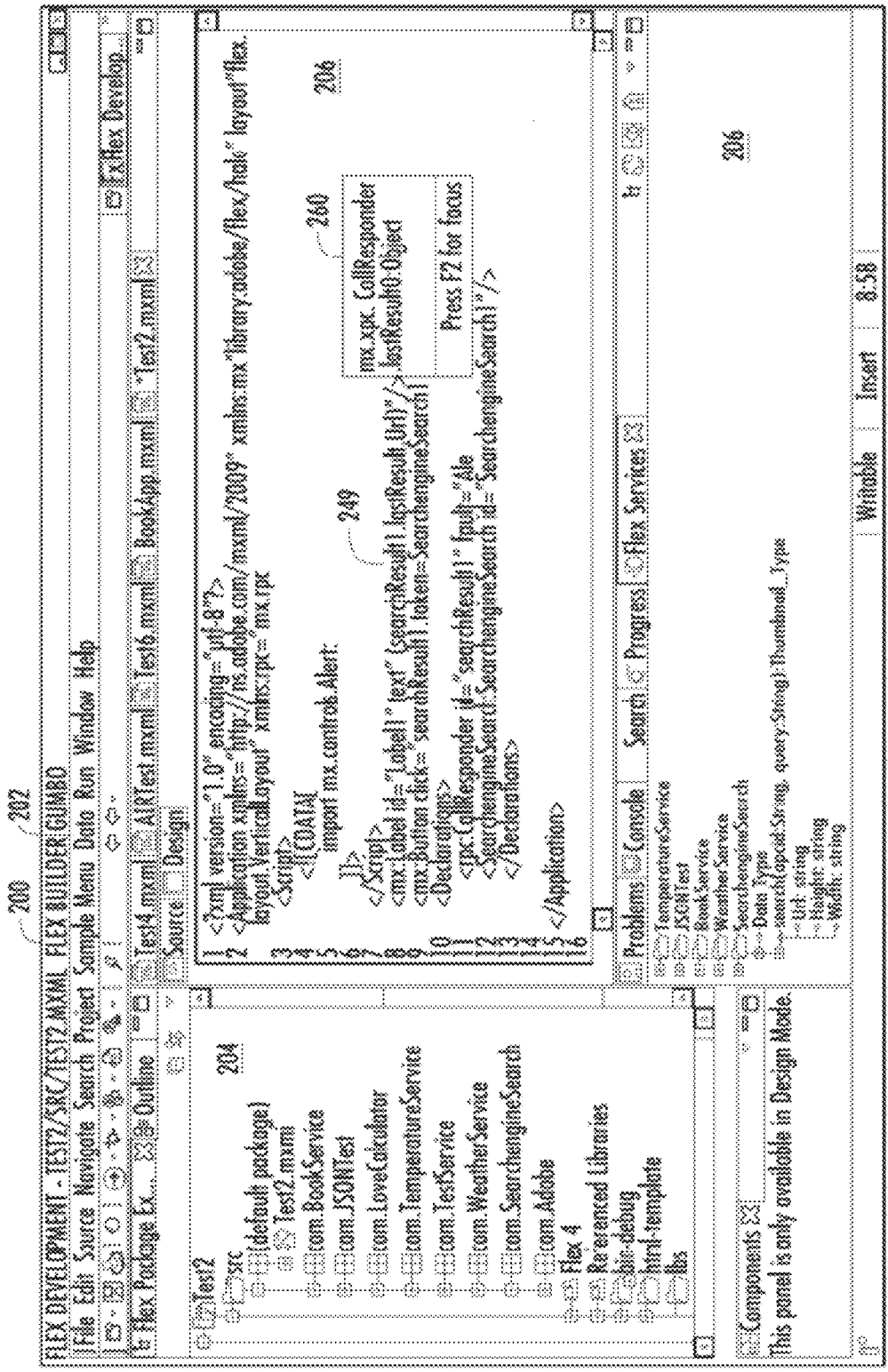

FIG. 11 shows use of one of the characterization of the returned data. Particularly, a user has defined a custom data type URL for the returned data parameter "url" instead of the default value "string." At 249, a source code element referencing a label UI component is entered, which in this example uses data binding so that the text value of the label refers to the "Url" parameter returned in the search results:

```
<mx: Label id="Label1" text="{searchResult1.lastResult.Url}">
```

Figure 12:
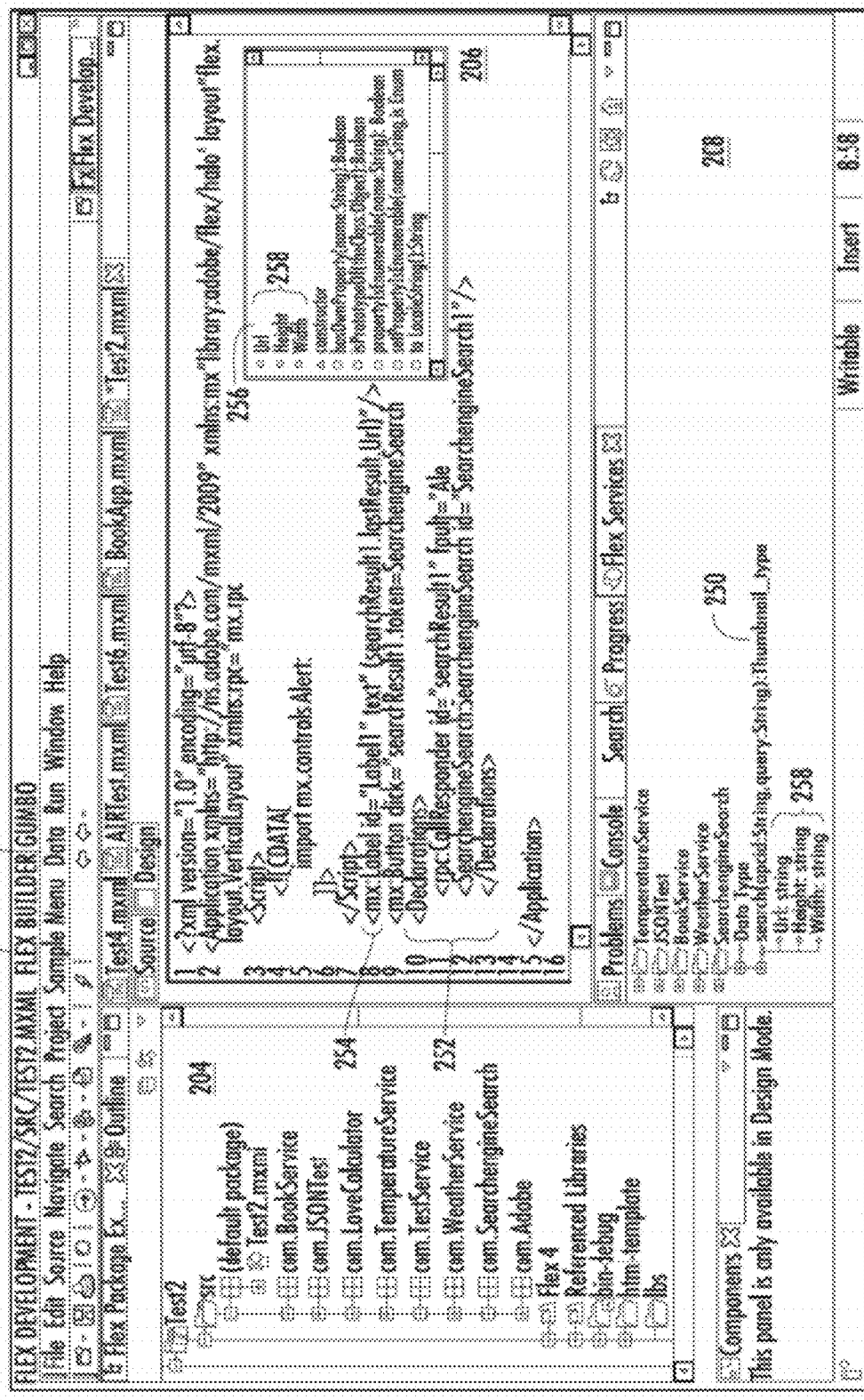

In this example, a hint has been provided at 260. Particularly, a tooltip comprising a text window has popped up in response to the selection of the text "searchResult1.lastResult." In this example, the tooltip identifies the source code segment that generates the object corresponding to the data returned from the web service. As another example, assume that the last search result is a strongly typed object, like "Employee," with certain properties (e.g., name, address, etc.). In that case, once "searchResult1.lastResult" is entered, upon entering the "." (period), the hinting could comprise fields FIG. 12 provides another example of outputting a hint. In this example, as was mentioned above, a subset of the data returned by the search( ) query is of interest as shown at 250, namely parameters 258. Code segment 252 represents a reference to the data source SearchEngineSearch. Code segment 254 references data returned by the query to SearchEngineSearch. For instance, this example shows a selection interface 256 that appears when the user provides input referencing the search results. Particularly, the application development tool recognizes that the user has typed or otherwise input an incomplete reference

```
Text="{searchResult1.lastResult.}"/>
```

Hint 256 comprises code hinting in this example. Specifically, a plurality of options to refer to data parameters based on the characterizations of the returned data during introspection. Particularly, due to the characterization, the application development tool is aware that the parameters Url, Height, and Width are available options for completing the statement that references the "lastResult" object holding the returned data. Additionally, since the user has indicated interesting only the subset of the returned data including Url, Height, and Width, the number of selections is limited to those earlier indicated to be of interest. Url, Height, and Width may further correspond to custom data type characterizations of the parameters.

Hint 256 has provided additional options for the expression, including other possible expressions such as "constructor," "hasOwnPropertyname," etc. that could be used to create a more complex reference to the object.

Figure 13:
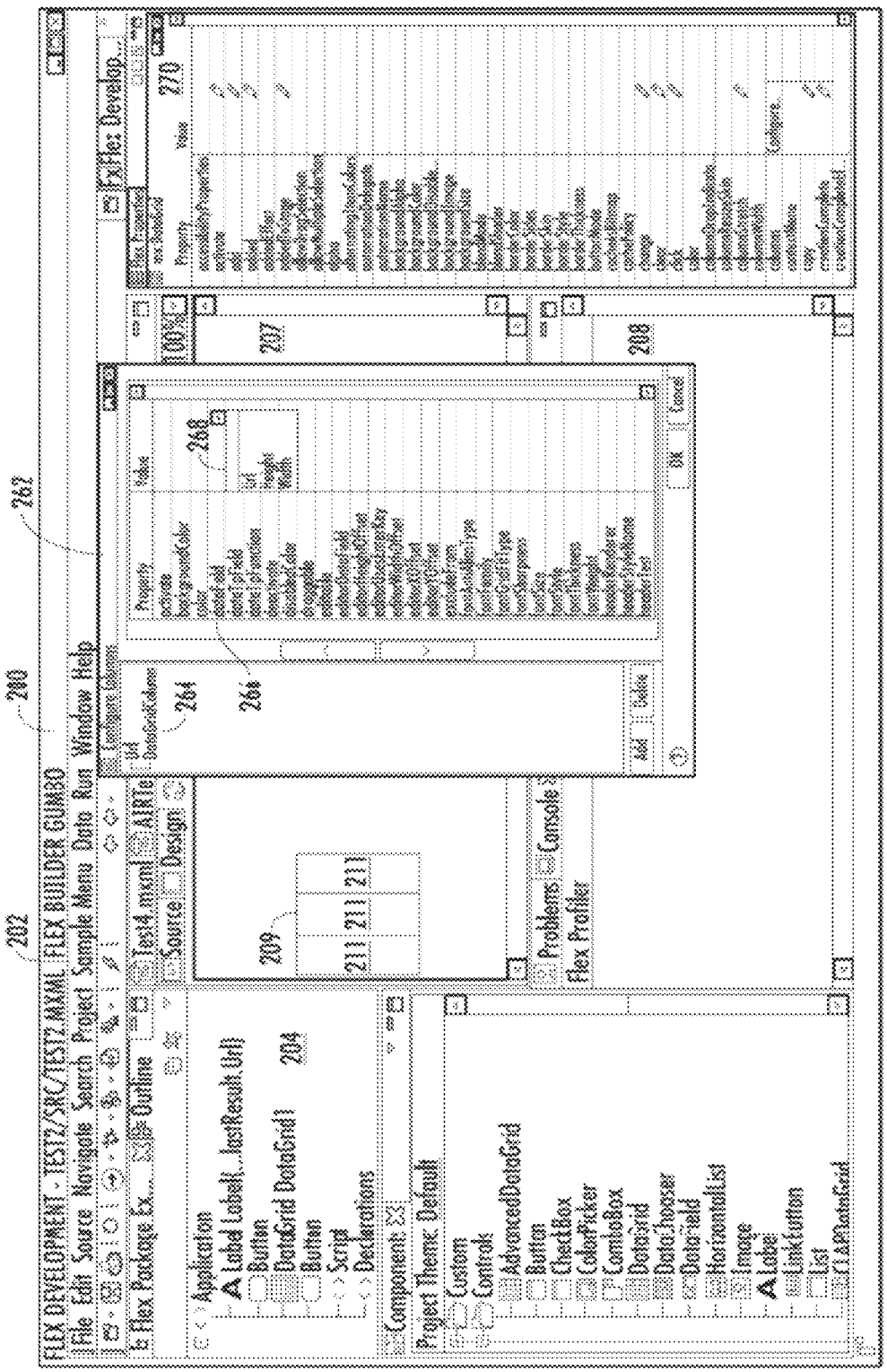

FIG. 13 shows an example of data hinting. In this example, a user has switched to a design view 207. As is known in the art, certain application development tools can allow a user to graphically lay out user interface and/or other elements of an application under development. The corresponding source code for the elements can be auto-generated, with the various code segments completed via further user input. In this example, data hinting is facilitated by characterizing the data to assist in auto-generating the code.

Dialog 262 represents an example of providing user input specifying data references for completing table 209 (comprising columns 211) shown in design view 207. For example, the developer may indicate that the source of data for table 209 is "searchResult1.lastResult." Based on such input, hint 268 can be generated when the user wishes to define various fields of the table. Namely, in this example, the hint comprises selection of the Url, Height, and Width parameters for the table property "datafield" shown at 266.

As another example, assume that the returned data structure comprises employee data, and the tool facilitates strongly typing the employee data. The tool can provide data hinting to allow a developer to configure columns in a data grid to display one or more fields of interest, with the fields of interest corresponding to particular fields for the "employee" data. For instance, if an "employee" object includes a name, an ID, and an address, the developer may indicate that one column of the data grid is to correspond to each "employee" object and the tool can provide selections for each column to choose from "name," "ID," and "address" in configuring the other grid columns.

Figure 14:
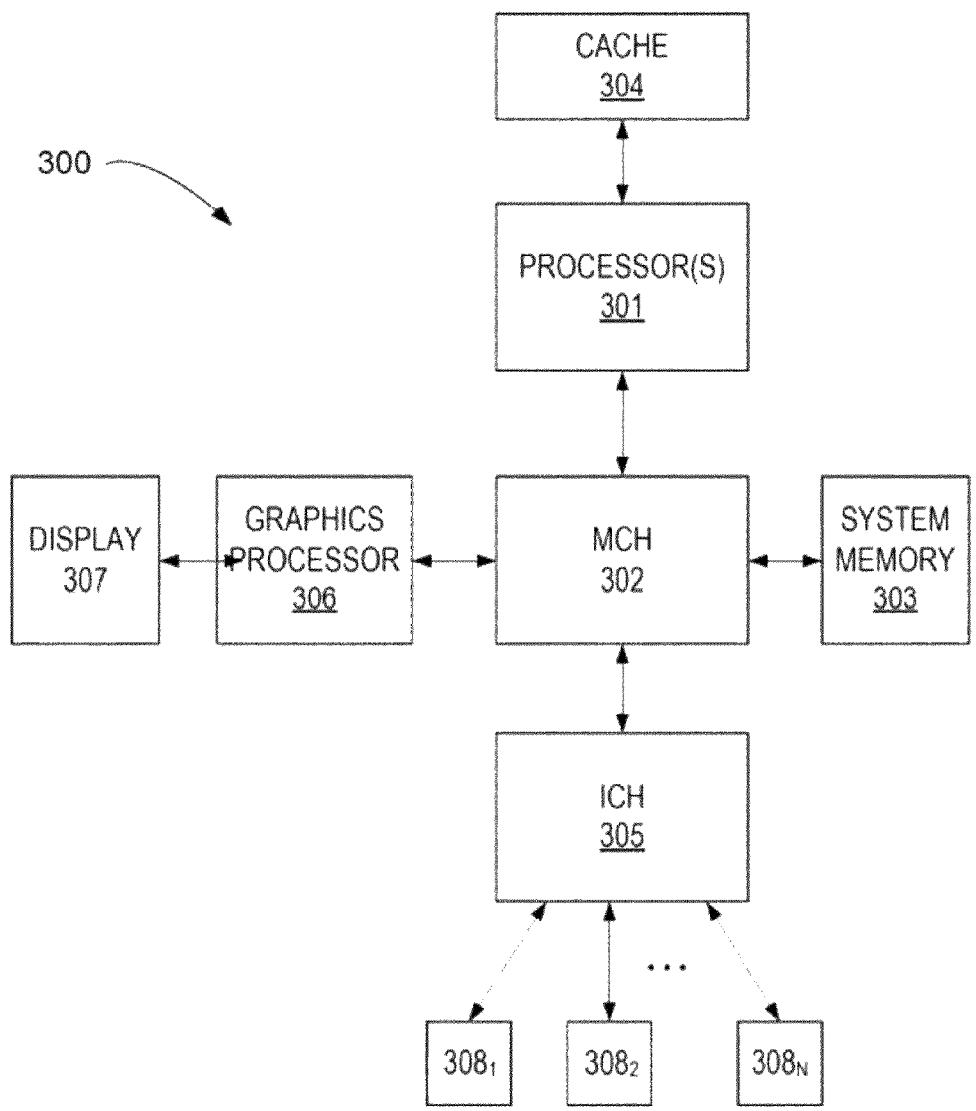
FIG. 14 is a block diagram illustrating components of an exemplary computing device.

FIG. 14 illustrates an example of computing device 300 suitable for implementing a software development tool as described in the examples above. The exemplary computing system of FIG. 14 includes: 1) one or more processors 301; 2) a memory control hub (MCH) 302; 3) a system memory 303 (of which different types exist such as DDR RAM, EDO RAM, etc,); 4) a cache 304; 5) an I/O control hub (ICH) 305; 6) a graphics processor 306; 7) a display/screen 307 (of which different types exist such as Cathode Ray Tube (CRT), Thin Film Transistor (TFT), Liquid Crystal Display (LCD), DPL, etc.); and/or 8) one or more I/O devices 308.

The one or more processors 301 execute instructions in order to perform whatever software routines the computing system implements. The instructions frequently involve some sort of operation performed upon data. Both data and instructions are stored in system memory 303 and cache 304. Cache 304 is typically designed to have shorter latency times than system memory 303. For example, cache 304 might be integrated onto the same silicon chip(s) as the processor(s) and/or constructed with faster SRAM cells whilst system memory 303 might be constructed with slower DRAM cells. By tending to store more frequently used instructions and data in the cache 304 as opposed to the system memory 303, the overall performance efficiency of the computing system improves.

System memory 303 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 303 prior to their being operated upon by the one or more processor(s) 301 in the implementation of a software program. Similarly, data that a software program determines should be sent from the computing system to an outside entity through one of the computing system interfaces, or stored into an internal storage element, is often temporarily queued in system memory 303 prior to its being transmitted or stored.

The ICH 305 is responsible for ensuring that such data is properly passed between the system memory 303 and its appropriate corresponding computing system interface (and internal storage device if the computing system is so designed). The MCH 302 is responsible for managing the various contending requests for system memory 303 access amongst the processor(s) 301, interfaces and internal storage elements that may proximately arise in time with respect to one another.

One or more I/O devices 308 are also implemented in a typical computing system. I/O devices generally are responsible for transferring data to and/or from the computing system (e.g., a networking adapter); or, for large scale non-volatile storage within the computing system (e.g., hard disk drive). ICH 305 has bi-directional point-to-point links between itself and the observed I/O devices 308.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting. The use of the term "developer" is not meant to limit the potential number or role of users of embodiments of the present subject matter.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computer system comprising:
a processor for executing instructions stored in a computer-readable medium on one or more devices providing an application development tool;
wherein the application development tool comprises one or more modules configured to perform operations comprising:
receiving an input modifying source code of an application, the source code providing one or more elements of the application when executed at runtime;
determining that the input specifies a reference in the source code to data returned by an interaction with a data source at runtime; and
responsive to determining that the input specifies the reference to the data returned by the interaction with the data source:
querying the data source and receiving a returned data sample comprising one or more data parameters in response to the query, wherein the one or more data parameters are communicated between the application and the data source at runtime to access data associated with the one or more data parameters;
characterizing the returned data sample, wherein characterizing the returned data sample comprises determining, from the returned data sample, a data structure definition for the returned data sample and a source code element for referring to the one or more data parameters; and
providing output comprising a suggested type characterization for the data returned by the interaction, wherein the suggested type characterization comprises at least one of (i) one or more options for completing an incomplete reference in the source code to the one or more data parameters and (ii) a suggested syntax of a source code segment referencing the one or more data parameters.

2. The computer system set forth in claim 1, wherein the source code element comprises an object having a nested data structure corresponding to the data structure definition for the returned data sample.

3. The computer system set forth in claim 1,
wherein characterizing the returned data sample further comprises inferring a data structure from the returned data sample and is based on an additional input specifying a subset of the data structure; and
wherein providing the output comprises providing a plurality of suggested type characterizations corresponding to the members of the subset.

4. The computer system set forth in claim 1, wherein the one or more modules are configured to characterize the returned data sample based on an additional input specifying a custom type characterization for use in referring to the source code element.

5. The computer system of claim 1 wherein the referring is performed to obtain a value associated with the one or more data parameters at runtime.

6. The computer system of claim 1 wherein the one or more modules are further configured to characterize the returned data sample by determining a relative location of the one or more data parameters in a data structure.

7. The computer system of claim 1, wherein determining the source code element comprises applying one or more heuristics to data in the returned data sample to determine a data structure of the returned data sample.

8. The computer system of claim 1, wherein the one or more options comprise one or more available objects referring to the one or more data parameters.

9. The computer system of claim 1, wherein the hinting module is further configured to:
   determine that one or more existing source code segments in the application incorrectly references the one or more data parameters; and
   based on determining that the one or more existing source code segments incorrectly references the one or more data parameters, provide one or more options for modifying the one or more existing source code segments to correctly reference the one or more data parameters.

10. A computer-implemented method comprising:
   receiving an input modifying source code of an application, the source code providing one or more elements of the application when executed at runtime;
   determining that the input specifies a reference in the source code to data returned by an interaction with a data source at runtime;
   responsive to determining that the input specifies the reference to the data returned by the interaction with the data source:
      querying the data source;
      characterizing data of a data sample returned by the data source in response to the query;
      wherein characterizing the data of the data sample comprises:
         identifying, from the data sample, one or more data parameters communicated between the data source and the application to access data associated with the one or more data parameters, and
         determining, from the data sample, a data structure definition for the data sample and a source code element for referring to the one or more data parameters; and
      providing output comprising a suggested type characterization for the data returned by the interaction, wherein the suggested type characterization comprises at least one of (i) one or more options for completing an incomplete reference in the source code to the one or more data parameters and (ii) a suggested syntax of a source code segment referencing the one or more data parameters.

11. The method set forth in claim 10, wherein the source code element that references the interaction with the data source by the application at runtime corresponds to input received by an application development tool.

12. The method set forth in claim 10, further comprising storing a data source characterization to a computer readable medium by adding an additional source code element to the source code for the application, the additional source code element referencing a query to the data source.

13. The method set forth in claim 10, further comprising storing a characterization to a computer readable medium by creating a data type within the source code for the application, the data type corresponding to the one or more data parameters.

14. The method set forth in claim 10, further comprising storing a characterization to a computer readable medium, wherein the characterization comprises a customized type for the source code element and is based on an additional input comprising customized type information.

15. The method set forth in claim 10, wherein characterizing the data of the data sample comprises inferring a data structure from the data sample.

16. The method set forth in claim 15, wherein characterizing the data of the data sample comprises identifying a subset of the data structure as being of interest based on an additional input.

17. The method set forth in claim 10, wherein providing the output comprising the suggested type characterization further comprises evaluating at least one additional source code segment and suggesting a change to the syntax of the at least one additional source code segment.

18. A non-transitory computer-readable medium embodying program code for an application development tool, the program code comprising:
   program code for receiving an input modifying source code of an application, the source code providing one or more elements of the application when executed at runtime;
   program code for determining that the input specifies a data interaction element, the data interaction element referencing an interaction by the application with a data source at runtime; and
   program code for, responsive to determining that the input specifies the data interaction element:
      querying the data source and receiving a returned data sample comprising one or more data parameters in response to the query, wherein the one or more data parameters are communicated between the application and the data source at runtime to access data associated with the one or more data parameters;
      characterizing the data of the returned data sample, wherein characterizing the data comprises determining, from the returned data sample, a data structure definition for the returned data sample and a source code element for referring to the one or more data parameters; and
      providing output comprising a suggested type characterization for the data returned by the interaction, wherein the suggested type characterization comprises at least one of (i) one or more options for completing an incomplete reference in the source code to the one or more data parameters and (ii) a suggested syntax of a source code segment referencing the one or more data parameters.

19. The computer-readable medium set forth in claim 18, wherein characterizing the data further comprises inferring a data structure from the returned data sample.

20. The computer-readable medium set forth in claim 18, wherein the source code element comprises an object having a nested data structure, the nested data structure corresponding to the data structure definition.

21. The computer-readable medium set forth in claim 20,
   wherein characterizing the data further comprises inferring a data structure from the returned data sample and is based on an additional input specifying a subset of the data structure; and
   wherein the output comprises a plurality of suggested type characterizations corresponding to the data parameters of the subset.

22. The computer-readable medium set forth in claim 18, wherein characterizing the data is based on an additional input specifying a custom type characterization for use in referring to the source code element.

23. The computer-readable medium set forth in claim 18,
   wherein the data interaction element referencing the interaction by the application with the data source at runtime comprises a query to the data source made by the application at runtime;
   wherein the program code for querying the data source results in the application development tool providing the same query to the data source at development time as is specified for the application to provide at runtime; and wherein the source code element comprises an object used by the application at runtime to refer to data returned by the query.

24. A method comprising:

receiving, by an application development tool executed by a processor, an input modifying source code of an application providing one or more elements of the application when executed at runtime;

determining, by the application development tool, that the input specifies a reference in the source code to data returned by an interaction with a data source at runtime; and responsive to determining that the input specifies the reference to the data returned by the interaction with the data source:

querying, by the application development tool, the data source;

characterizing, by the application development tool, data of a data sample returned in response to querying the data source, wherein characterizing the data of the data sample comprises inferring a data structure definition for the data sample; and providing, by the application development tool, output comprising a suggested type characterization for the data returned by the interaction, wherein the suggested type characterization comprises one or more options for completing an incomplete reference in the source code to the data returned by the interaction.

* * * * *